Patented Apr. 29, 1947

2,419,732

UNITED STATES PATENT OFFICE 2,419,732

METHOD FOR THE MANUFACTURE OF FILLING FOR BEDDING

Isaac Rubinstein, Brooklyn, N. Y.

No Drawing. Application December 20, 1943, Serial No. 515,075

2 Claims. (Cl. 19—66)

This invention relates to new and useful improvements in a filling for bedding and upholstery, and a method for the manufacture thereof.

Heretofore, attempts have been made to produce a filler for bedding and upholstering purposes, consisting of an intermingled and interlocked mixture of down and wool or other fibres. However, at the moment down is very scarce, and even if plentiful, is not exactly ideal for the job intended because it is too fine and delicate, too soft and too fragile in comparison to the wool or other fibres with which it is mixed. As a result the down is collapsed by these fibres and the benefits from the down in the filling composition is lost.

I have discovered that chicken feathers are far superior as an ingredient to be mixed, intermingled and interlocked with wool or other fibres. The chicken feathers are stronger, more resilient, more flexible and tougher in every respect than down, and capable of withstanding the pressures exerted by the wool or other fibres, and thus avoiding collapsing and utter uselessness insofar as resiliency is concerned.

I am aware that chicken feathers in the past have been used as a filling for bedding. But 100% chicken feathers is not accepted as a good filling because it is too heavy and too hard. I am also aware that numerous fillers have been proposed for bedding which comprise a mixture of various fibres and various feathers. However, I have discovered that a superior filling may be obtained by a mixture and the intermingling and interlocking of chicken feathers and wool, or cotton nap, preferably wool nap e. g. the longhaired fibre of wool, in the proportion of 50% of each of these ingredients. The chicken feathers may be used up to 90%, but should never exceed this amount.

Hen or turkey feathers may also be used instead of chicken feathers, mixed with any wool and/or cotton fibres in any desired proportion of each article.

Duck or goose down which has been previously proposed as one of the ingredients in a filler for bedding, costs approximately ten times as much as chicken feathers. Moreover, a smaller number of chickens are necessary for accumulating usuable chicken feathers in comparison to the number of ducks required to collect an equal amount in weight of down.

An improved method is also proposed for manufacturing the improved filler for bedding. It is proposed that the wool nap or other nap may be first carded to form a fluffy and resilient mass. The chicken feathers should be similarly treated. In this fluffy condition the two are mixed together and carded or combed a second time to entwine and interlock the chicken feathers with the wool mass. The mixture is now saturated with a liquid which will cause the wool nap to swell and better engage the chicken feathers which are not affected by the liquid. The liquid may be water, or water in which some suitable chemical has been dissolved or suspended. For example, a germicidal or the like ingredient may be used. The filler is then dried and ready for use.

While I have carefully described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In a method of shaping a resilient non-collapsible filler for bedding and upholstering, the steps of inter-mingling and interlocking chicken feathers with wool nap, carding said mixture to form a fluffy and resilient layer of inter-twined and interlocked chicken feathers and wool nap, and saturating said mixture with an aqueous liquid to swell the wool nap so as to better interlock the same with the chicken feathers.

2. In a method of shaping a resilient non-collapsible filler for bedding, and upholstering purposes, the steps of inter-mingling and interlocking chicken feathers with wool nap, carding said mixture to form a fluffy and resilient layer of intertwined and interlocked chicken feathers and wool nap, saturating said mixture with an aqueous liquid to swell the wool nap so as to better interlock the same with the chicken feathers, and drying said filler.

ISAAC RUBINSTEIN.

REFERENCES CITED

The following references are of record in the file of this patent:

UNITED STATES PATENTS

| Number | Name | Date |
|---|---|---|
| 44,223 | Schott | Sept. 13, 1864 |
| 253,833 | Berger | Feb. 21, 1882 |
| 276,650 | Weigell | May 1, 1883 |
| 231,459 | Stilwell | Aug. 24, 1880 |
| 1,687,867 | Lange | Oct. 16, 1928 |
| 2,001,782 | Goodstein | May 21, 1935 |
| 709,622 | Warren et al. | Sept. 23, 1902 |
| 49,367 | Bloodgood et al. | Aug. 15, 1865 |
| 2,078,886 | Weinberg | Apr. 27, 1937 |

FOREIGN PATENTS

| Number | Country | Date |
|---|---|---|
| 16,308 | British | 1891 |